(12) United States Patent
Kahn

(10) Patent No.: US 6,532,264 B1
(45) Date of Patent: Mar. 11, 2003

(54) PROCESSING SEQUENTIAL VIDEO IMAGES TO DETECT IMAGE MOTION AMONG INTERLACED VIDEO FIELDS OR PROGRESSIVE VIDEO IMAGES

(75) Inventor: Barry Kahn, Orlando, FL (US)

(73) Assignee: TeraNex, Inc., Orlando, FL (US)

( * ) Notice: Subject to any disclaimer, the term of this patent is extended or adjusted under 35 U.S.C. 154(b) by 0 days.

(21) Appl. No.: 09/535,563

(22) Filed: Mar. 27, 2000

(51) Int. Cl.⁷ ................................................ H04B 1/66
(52) U.S. Cl. ................................................ 375/240.16
(58) Field of Search ............................ 375/240, 240.01, 375/240.02, 240.14, 240.15, 240.16; 348/452, 459, 699, 700; H06B 1/66

(56) References Cited

U.S. PATENT DOCUMENTS

| | | | |
|---|---|---|---|
| 4,890,160 A | | 12/1989 | Thomas |
| 5,016,102 A | | 5/1991 | Avis |
| 5,093,720 A | * | 3/1992 | Krause et al. ............... 348/452 |
| 5,175,618 A | * | 12/1992 | Ueda et al. ............. 375/240.13 |
| 5,191,416 A | * | 3/1993 | Dickson et al. ............. 348/459 |
| 5,469,226 A | * | 11/1995 | David et al. ................. 348/699 |
| 5,648,815 A | | 7/1997 | Toba |
| 5,650,829 A | | 7/1997 | Sugimoto et al. |
| 5,682,205 A | * | 10/1997 | Sezan et al. ................. 348/452 |
| 5,745,183 A | | 4/1998 | Lam |
| 5,751,364 A | | 5/1998 | Yasuda et al. |
| 6,057,892 A | * | 5/2000 | Borer .......................... 348/699 |
| 6,101,222 A | * | 8/2000 | Dorricott .................... 375/240 |
| 6,118,887 A | | 9/2000 | Cosatto et al. |
| 6,151,363 A | * | 11/2000 | Burl et al. ............. 375/240.17 |

OTHER PUBLICATIONS

"The Engineer's Guide to Motion Compensation" by John Watkinson, 1994: Snell & Wilcox Ltd.

* cited by examiner

*Primary Examiner*—Howard Britton
*Assistant Examiner*—Tung T. Vo
(74) *Attorney, Agent, or Firm*—Burns, Doane, Swecker & Mathis, LLP (57) ABSTRACT

Video images are processed to detect image motion among sequential images (e.g., progressive non-interlaced images of a video signal and/or interlaced fields of a video signal), each image being represented using a plurality of pixels. Exemplary embodiments replace block-based motion estimation with pixel-based motion estimation. A correlation surface is generated for every pixel in a reference image, from which a motion vector and confidence metric (i.e., a measure of confidence in the accuracy of the motion vector) are extracted for each pixel.

4 Claims, 9 Drawing Sheets

PROCESSING SEQUENTIAL VIDEO IMAGES TO DETECT IMAGE MOTION AMONG INTERLACED VIDEO FIELDS OR PROGRESSIVE VIDEO IMAGES

BACKGROUND OF THE INVENTION

1. Field of the Invention

The present invention is generally related to image processing, and more particularly, to correlation of multiple images to detect image motion.

2. Background Information

One aspect of image processing involves estimating the motion between successive images for, among other reasons, creating synthetic images that allow for conversion from one frame rate to another. Such techniques are applied to both progressive images and interlaced images (e.g., progressive or interlaced television images). Progressive images constitute complete images, for which complete pixel information is available. In a typical video signal, wherein frames of image data are broken into even and odd fields, a progressive image would be a composite of the even and odd fields associated with a particular frame. Progressive images can be contrasted with interlaced video images, which contain sequential fields that are spatially and temporally nonaligned (such as the even and odd field associated with a typical video signal). A synchronous frame rate conversion involves generating synthesized frames of interpolated image information.

With regard to interlaced images, an additional problem exists due to the spatial and temporal offset which exists from one image to the next. For example, in a single video frame constituted by two interlaced fields of information separated in space (e.g., by one line), and separated in time (e.g., by one half of a frame time). One field includes the odd numbered scan lines of an image, while the next successive field includes the spatially offset even numbered scan lines. The temporal separation between these successive fields causes an additional spatial offset of the first video field with the second video field due to image motion. To perform digital image processing on interlaced video images, the interlacing must be removed so that image processing algorithms can operate on an entire, coherent frame of video information. Accordingly, it is desirable to remove the interlacing and spatially align the two video fields into a coherent video frame.

Techniques for detecting image motion among sequential video images generally fall into two categories: (1) phase correlation techniques using, for example, fast Fourier transforms; and (2) block matching. Phase correlation is described in a document entitled "The Engineer's Guide To Motion Compensation" by John Watkinson, 1994: Snell & Wilcox Ltd., the disclosure of which is hereby incorporated by reference in its entirety. As described therein, phase correlation involves spectral analysis of two successive fields, and then subtracting all phases of the spectral components. A reverse transform is applied to the phase differences to identify peaks whose position correspond to motions (i.e., motion vectors) between the fields. Because the phase correlation does not identify the pixel locations associated with the motion, a block matching process is required to select the best motion vector detected from the phase correlation which correlates motion in the image to pixel locations.

A block matching technique is described in U.S. Pat. No. 5,016,102 (Avis), the disclosure of which is hereby incorporated by reference in its entirety. In this patent, image motion is detected by comparing blocks in a first field or frame of a video signal with blocks in a following field or frame of the video signal to derive motion vectors. Block-based motion estimation typically involves operating on blocks of image pixels of 8×8 or 4×4 pixels per block. These estimators attempt to correlate blocks from a first field with blocks from a second field to measure interfield motion. A correlation surface representing the differences in content between the block in the first field or frame and the content of each block in the following field or frame with which it has been compared is then produced. The correlation surface is examined to determine whether a clear minimum value of the differences exists, as a representation of the motion vector, associated with image data included in the block. The motion vectors thus represent the motion of content in respective blocks of the first field or frame with respect to the following field or frame.

However, these known techniques are unable to achieve adequate correlations when operating on detailed imagery with complex motion. These techniques can not definitively produce correlation vectors for all sequential images with perfect accuracy. Rather, there is room for improvement in these techniques.

SUMMARY OF THE INVENTION

The present invention is directed to improving the accuracy with which video images are processed to detect image motion among sequential images (e.g., progressive non-interlaced images of a video signal and/or interlaced fields of a video signal), each image being represented using a plurality of pixels. Exemplary embodiments replace block-based motion estimation with pixel-based motion estimation. A correlation surface is generated for every pixel in a reference image, from which a motion vector and confidence metric (i.e., a measure of confidence in the accuracy of the motion vector) are extracted for each pixel.

In accordance with exemplary embodiments, first information obtained from pixels used to represent a first image is compared with respect to second information obtained from pixels used to represent a second image, to produce a correlation surface representative of image motion. A motion vector can be extracted from correlation data included in the correlation surface as a measure of image motion among the at least two images. Subsequently, a measure of confidence in the accuracy with which the motion vector has been generated is produced, the measure being determined using a first point (e.g., best) on the correlation surface and a second point (e.g., second best) on the correlation surface, the second correlation point being spaced at least a predetermined distance from the first point on the correlation surface. Pixel correspondence and the span of a search area in the image over which a sample block is moved are variable parameters of the motion estimation which can be set as a function of the particular application and computational capability of the system used.

When processing interlaced fields of image data, estimation of motion is complicated by the fact that consecutive fields are spatially nonaligned. Accordingly, for interlaced video fields, the present invention computes correlation surfaces for each pixel using two different methods, and the results are then combined to provide a single correlation surface for each pixel, from which a motion vector and associated confidence metric can be produced for each pixel. The first method, intraframe correlation, is a measure of motion between a first reference field and a temporally spaced second field (e.g., an odd field and the next successive even field). First information obtained from pixels of the first field is compared with second information obtained from pixels of a second field, the second field being temporally separated and spatially nonaligned with respect to the first field, to generate a first correlation surface. The second method, interframe correlation, detects motion between the first field and a third field that is temporally spaced two fields (i.e., one frame) from the first field. That is, the first information is compared with third information obtained from pixels of a third field, the third field being temporally separated and spatially aligned with the first field, to generate a second correlation surface. The first and second correlation surfaces for each pixel are combined into a composite correlation surface, and a motion vector is extracted from correlation data of the composite correlation surface as a measure of image motion among at least two images. A confidence metric can be produced for each motion vector, in a manner similar to that described with respect to progressive video images, as a measure of confidence in the accuracy with which the motion vector has been produced.

BRIEF DESCRIPTION OF THE DRAWINGS

Other objects and advantages of the present invention will become more apparent to those skilled in the art upon reading the detailed description of the preferred embodiments, wherein like elements have been designated by like numerals, and wherein.

DETAILED DESCRIPTION OF THE PREFERRED EMBODIMENTS

1. Detecting Image Motion Among Progressive Images

Figure 1:
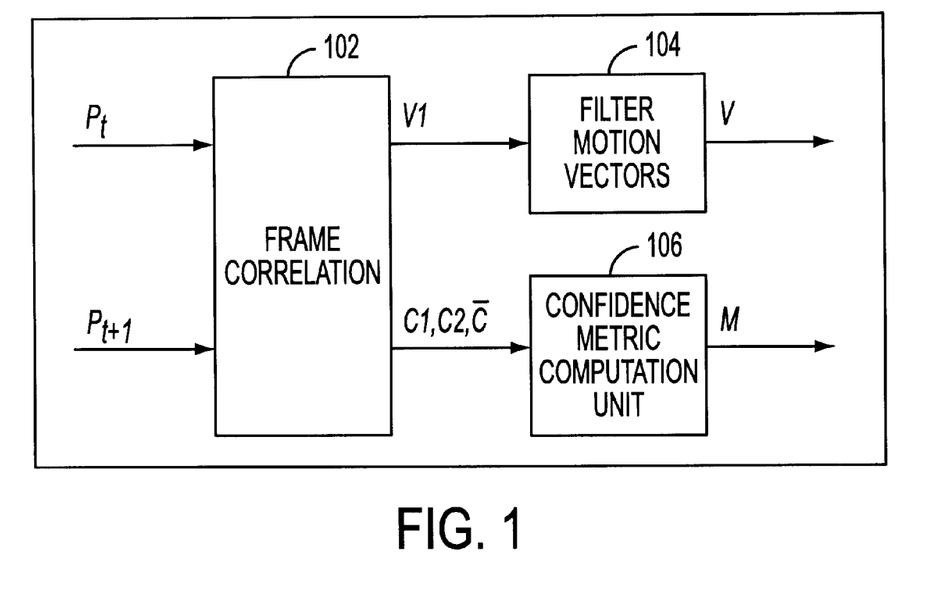
FIG. 1 is a block diagram of an exemplary motion estimator for non-interlaced progressive images in accordance with the present invention.

An exemplary motion estimator for estimating motion within a sequence of progressive images is illustrated in FIG. 1. In FIG. 1, at least two images, such as two sequential frames of image data in a video signal, or any two frames, are processed to detect image motion. The two frames are labeled $P_t$ and $P_{t+1}$, with $P_t$ being the frame of interest, and $P_{t+1}$ being the next sequential image frame that is used to identify motion with respect to the image of interest. "A" from page 5 of -067.

The two video frames $P_t$ and $P_{t+1}$ are supplied to a means for comparing first information obtained from pixel locations used to represent a first image with second information obtained from pixel locations used to represent a second image, to produce a correlation surface representative of image motion. The comparing means is implemented as dedicated hardware, or as software executed by a processor. The comparing means is represented in FIG. 1 as frame correlation unit 102. The frame correlation unit produces a correlation surface for each pixel in the frame of interest, from which correlation data (C1,C2,$\overline{C}$) and an unfiltered motion vector V1 are extracted for each pixel as a measure of image motion among the at least two images. The correlation data is used to produce a confidence metric representing a measure of confidence in the accuracy of the motion vector.

The unfiltered motion vector is supplied to a filter 104, which can be configured in accordance with any known motion vector filtering algorithm including, but not limited to, those described in the aforementioned U.S. Pat. No. 5,016,102. Alternately the filtering can be performed according to yet another feature of the present invention. The filter 104 can be implemented as dedicated hardware, or as software executed by a processor, such as the processor used to implement the frame correlation unit. The correlation data extracted from each correlation surface is supplied to a means for producing a measure of confidence of accuracy with which the motion vector is generated, the measure being determined using a first point on the correlation surface and a second point on the correlation surface, the second point being spaced at least a predetermined distance from the first point on the correlation surface. The measure of confidence producing means is represented in FIG. 1 as confidence metric computation unit 106 configured in accordance with a further feature of the present invention as either dedicated hardware, or as software executed by a processor, such as the processor used to implement the frame correlation unit 102 and/or filter 104.

The filter 104 and the confidence metric computation unit 106 supply outputs which include a motion vector for each pixel of the reference frame. That is, for each pixel, a motion vector is produced which is representative of motion of each pixel's image content from frame $P_t$ to frame $P_{t+1}$. The unit 106 outputs a measure of confidence in the accuracy with which each motion vector has been computed. That is, the motion vectors define the shift required to temporally align $P_t$ (the frame of interest) with the frame $P_{t+1}$. The confidence metric defines the certainty (e.g., quantified as a value from 0 to 1) that the vectors are accurate in identifying the shift. The filtered motion vector is designated $V_{XY}$ and the motion vector confidence metric is designated $M_{XY}$ for every pixel (X,Y) in the reference image.

In accordance with exemplary embodiments of the present invention, the frame correlation unit 102, filter 104 and the confidence metric 106 can be implemented using dedicated hardware, such as a pipelined processor, or can be implemented as software executed by a processor, such as processors disclosed in U.S. application Ser. No. 08/112,540 filed Aug. 27, 1993, entitled PARALLEL DATA PROCESSOR, and having input/output implemented as disclosed in U.S. application Ser. No. 08/980,338 filed Nov. 28, 1997, entitled INTERFACE FOR PROCESSING ELEMENT ARRAY, the contents of which are hereby incorporated by reference in their entireties. Alternately, a parallel processor as described in commonly assigned, copending U.S. application Ser. No. 09/057,482 entitled MESH CONNECTED COMPUTER, the disclosure of which is hereby incorporated by reference in its entirety can be used to execute the functionality described herein. In yet another embodiment, the present application can be implemented as software executed by an apparatus as described in U.S. application Ser. No. 09/511,697, filed on Feb. 23, 2000, and entitled: DISTRIBUTION, PROCESSING, AND RECONSTRUCTION OF VARIABLE-SIZED IMAGES USING MULTIPLE PROCESSOR ARRAYS, the disclosure of which is incorporated by reference in its entirety.

Figure 2:
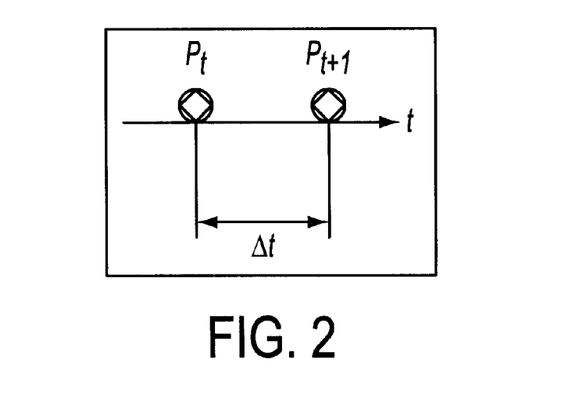
FIG. 2 is a symbolic representation of frames used in progressive frame correlation.
Figure 3A:
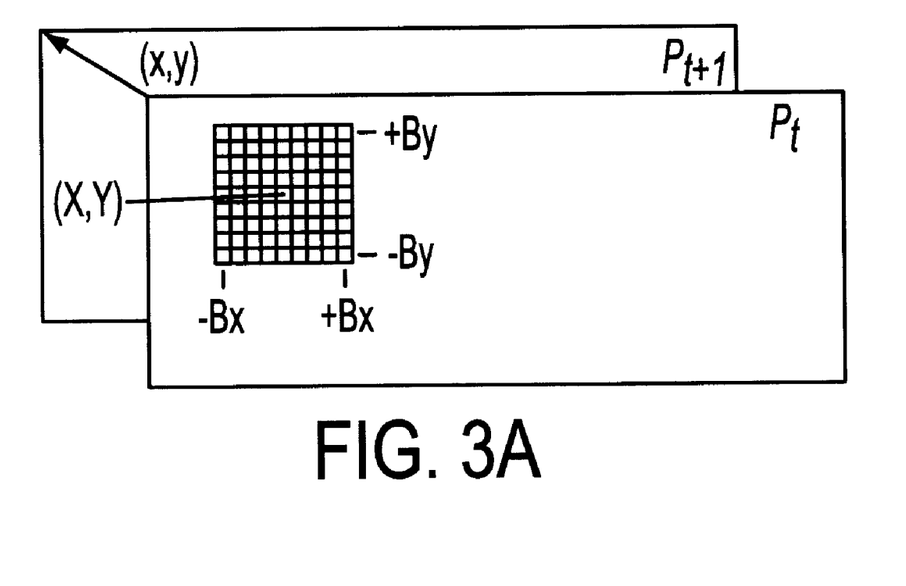
FIGS. 3A and 3B are illustrations of progressive frame correlation.
Figure 3B:
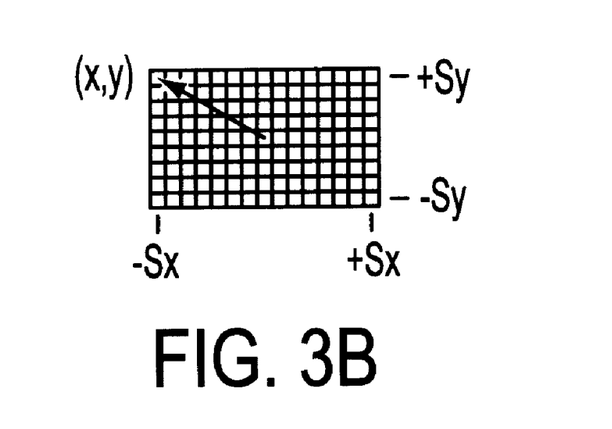

The progressive image (e.g., frame) correlation uses spatially aligned frames $P_t$ and $P_{t+1}$ that are temporally separated by one frame ($\Delta t$), as shown symbolically in FIG. 2, although any desired temporal separation can be used. The frame correlation implemented by frame correlation unit 102 is performed by defining a search area within the frame $P_{t+1}$. For example, in FIG. 3B, a search area $\pm Sx$, $\pm Sy$ is defined with respect to the frame $P_{t+1}$ for a given pixel in the reference frame $P_t$. A block is defined which extends over image pixels from $-Bx$ to $+Bx$ and from $-By$ to $+By$. The block center is located within the search area (i.e., the entire block need not be located in the search area) and used to calculate a correlation point $C_{XY}$ on a correlation surface (See FIG. 3A). This process is performed by repeatedly moving the block center to a new location within the search area to generate a set of correlation points (i.e., one correlation point is calculated for each location of the block). This process is repeated for each possible location of the block center within the search area which extends from $-Sx$ to $+Sx$ and from $-Sy$ to $+Sy$ (see FIG. 3B).

The set of correlation points is mapped into a correlation surface for each pixel. The correlation surface will correspond in size to the search area $\pm Sx$, $\pm Sy$. The progressive frame correlation process by which each correlation point of the correlation surface for a given pixel is calculated, is defined by:

$$C_{XY}(x, y) = \frac{\sum_{i=-B_x}^{B_x} \sum_{j=-B_y}^{B_y} |P_t(X+i, Y+j) - P_{t+1}(X+i+x, Y+j+y)|}{\Delta t}$$

In this equation, "i" and "j" are integers incremented in accordance with the two summations shown. The values "x" and "y" define the motion vector for which the correlation value has been computed.

Thus, for each pixel in the frame $P_t$, a correlation surface is produced which comprises a SAD (sum of the absolute difference) for each location of the block center within the search area. Each SAD represents a correlation point $C_{xy}$ on the correlation surface, the SAD being recomputed each time the block is moved within the search region. The mapping of all SADs for a given search area constitutes the correlation surface for a given pixel.

Because each SAD provides one correlation point $C_{XY}$ on the correlation surface, the correlation surface is a two-dimensional array wherein each point is mapped to a pixel location in the search area of the frame $P_{t+1}$. Using the correlation surface, the pixel location to which image data of a given pixel in frame $P_t$ has moved in frame $P_{t+1}$ can be determined. The lower the SAD associated with a given point on the correlation surface, the better the correlation.

Those skilled in the art will appreciate that any block size suitable for a particular application and computation capability of the system can be used to generate a correlation surface for a given pixel, from which a motion vector for the given pixel can be derived. The correlation block size ($\pm Bx$ pixels horizontally by $\pm By$ pixels vertically) can be set to a size large enough such that the SAD is statistically valid, yet small enough to be responsive to movement of small structures.

Figure 4A:
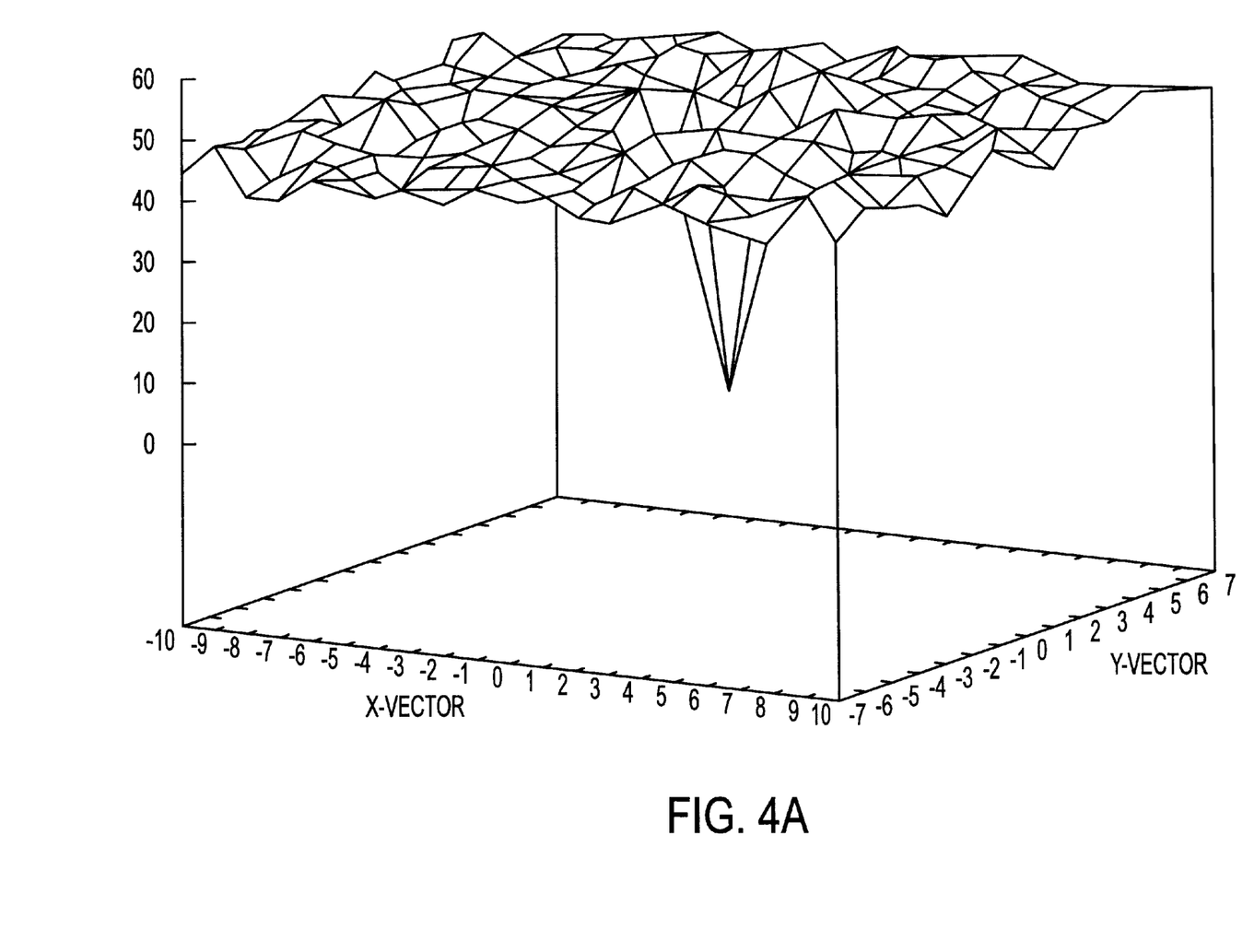
FIGS. 4A and 4B are 3-dimensional examples of correlation surfaces.
Figure 4B:
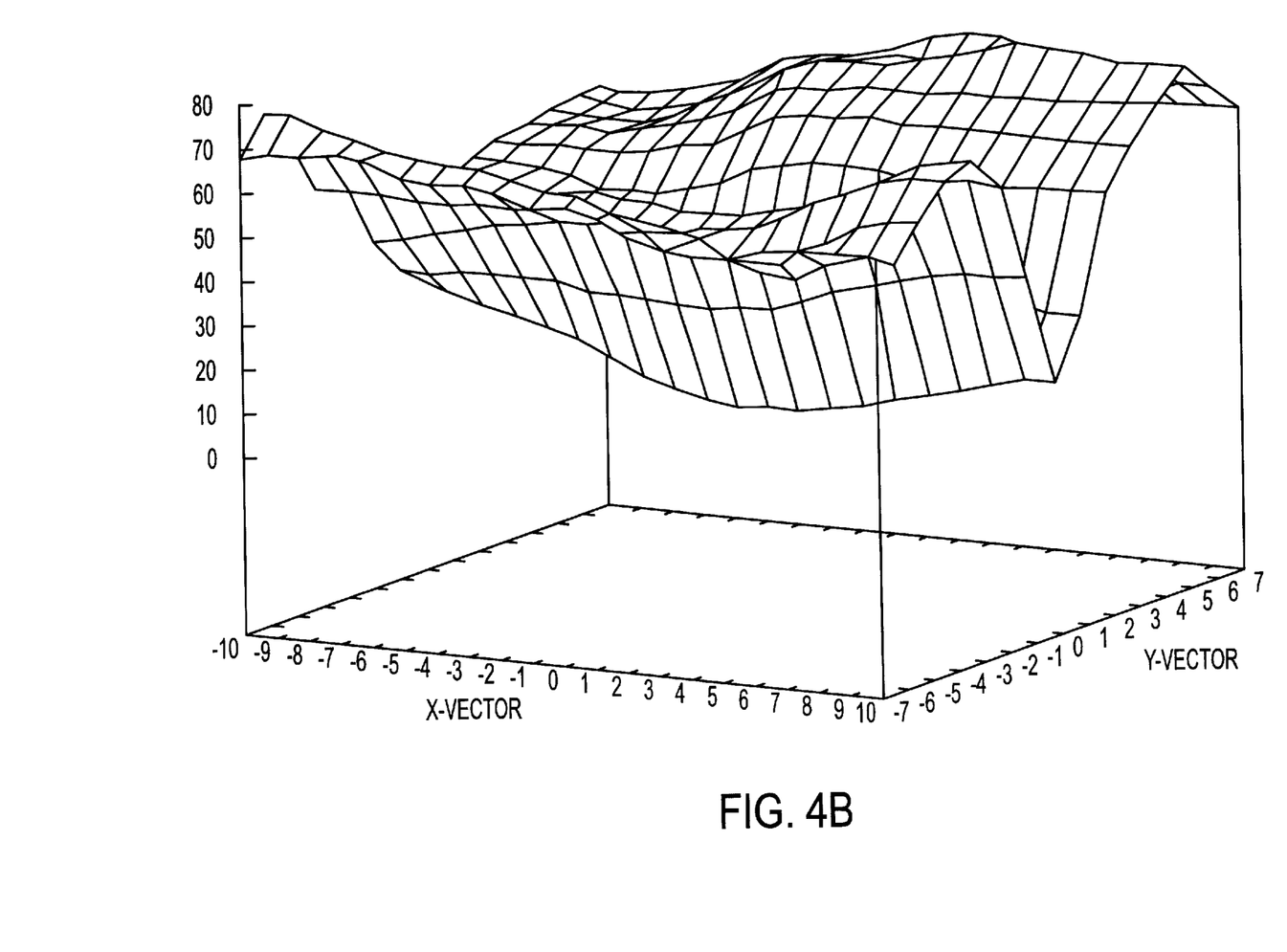

Two examples of correlation surfaces are shown in FIGS. 4A and 4B. In FIG. 4A, there is a predominant "well" representing a strong correlation surrounded by poor correlations. Thus, this correlation surface provides a good indication that image data associated with the pixel of interest in frame $P_t$ has moved to the pixel location in frame $P_{t+1}$ which corresponds to the location of the "well". In FIG. 4B, there is a "valley" which is indicative of ambiguous correlations along a linear structure.

The correlation surface determined for a given pixel is analyzed to extract the best ($C1_{XY}$) and second-best ($C2_{XY}$) correlation points in frame $P_{t+1}$ of the pixel of interest in frame $P_t$. That is, these points represent the best match of image data to that of the given pixel in frame $P_t$ for which the correlation surface was produced. The motion vector $V1_{XY}$ associated with $C1_{XY}$ is selected as the most likely candidate for accurately identifying the direction and the amount of motion the image data of the given pixel in frame $P_t$ underwent between frames $P_t$ and $P_{t+1}$. That is, the best correlation value $C1_{XY}$ is the minimum value within the correlation surface for the given pixel and is used to extract a motion vector which represents the motion of the pixel's image data between frames $P_t$ and $P_{t+1}$. The value $C1_{XY}$ is defined by:

$$C1_{XY} = \min(C_{XY}(x,y))$$

Figure 5:
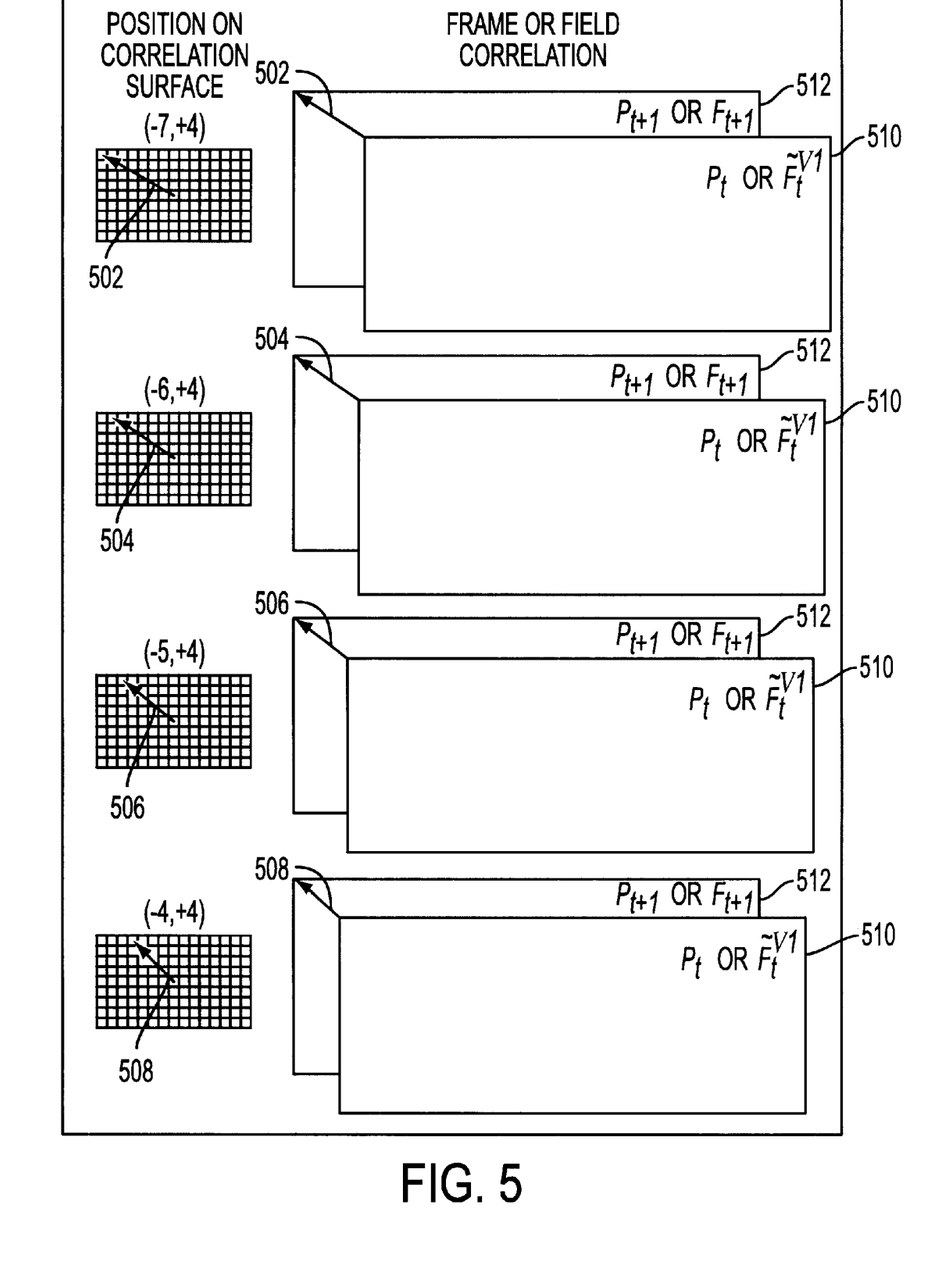
FIG. 5 is an illustration of four intraframe correlation vectors for a small correlation surface.

The geometry for computing four motion vectors of a small correlation surface using the correlation data C1 is illustrated in FIG. 5. FIG. 5 illustrates four different motion vectors 502, 504, 506 and 508 associated with two images 510 and 512 (represented as the two frames $P_t$ and $P_{t+1}$, or as two fields $F_t^{V1}$ and $F_{t+1}$). Each of the four motion vectors corresponds to the distance and direction which image data associated with a given pixel has moved in transitioning from the pixel location in frame $P_t$ to the pixel location in frame $P_{t+1}$. The position of $C1_{XY}$ on each correlation surface implies the motion that the image data associated with the pixel of interest has undergone. The motion vector associated with that correlation is:

$$x1_{XY} = \{x | C_{XY}(x, y) = C1_{XY}\}$$
$$y1_{XY} = \{y | C_{XY}(x, y) = C1_{XY}\}$$
$$V1_{XY} = \begin{bmatrix} x1_{XY} \\ y1_{XY} \end{bmatrix}^T$$

Only the motion vector associated with the best correlation (for each pixel in the image) is retained for subsequent filtering.

Figure 6:
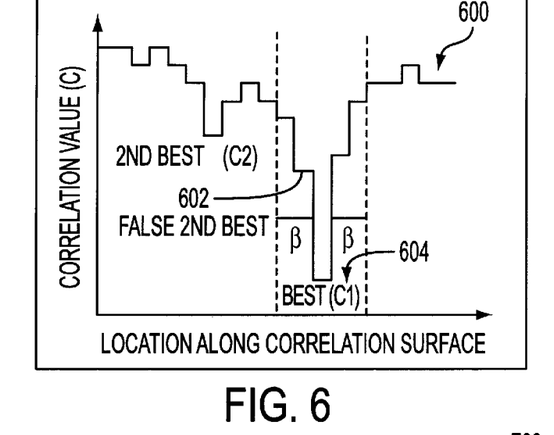
FIG. 6 is an illustration of a second-best correlation selection.

The second-best correlation value and the average correction value $\overline{C}_{XY}$ for a given pixel are provided to enable the computation of the correlation confidence metric. The second-best correlation value is $C2_{XY}$, the next ranked minimum located beyond a predetermined distance (e.g., a specified radius ($\beta$)) from the best value $C1_{XY}$ for the given pixel, as shown in the cross-section 600 of a correlation surface in FIG. 6. The use of a minimum radius increases the likelihood that the second-best correlation is not a false second best correlation point 602 associated with the best correlation point 604.

The average correlation value ($\overline{C}_{XY}$) for the surface is computed as follows:

$$\overline{C}_{XY} = \frac{\sum_{x=-S_x}^{S_x} \sum_{y=-S_y}^{S_y} C_{XY}(x, y)}{(2S_X + 1)(2S_Y + 1)}$$

The foregoing process of determining correlation data $C1_{XY}$, $C2_{XY}$ and $\overline{C}_{XY}$ is repeated for each pixel in frame $P_t$, so that a motion vector and associated confidence metric can be extracted for every pixel. For each pixel of frame $P_t$ to be analyzed, a new search area is identified in $P_{t+1}$. The block ±Bx, ±By is moved about the search area, with each location of the block being used to generate a correlation point on a correlation surface associated with the pixel of interest in frame $P_t$. The collection of correlation points obtained from the search area is mapped to the correlation surface for the pixel. Using the correlation surface, correlation data C1, C2, $\overline{C}$ is obtained, from which the motion vector and motion vector confidence metric can be extracted for the pixel of interest. This process is repeated until a motion vector has been determined for all pixels in the frame or field of interest.

a. Motion Vector Filtering

After generating motion vectors and confidence metrics for each pixel of frame $P_t$, the motion vectors are filtered in unit 104. The motion vectors are processed to identify and replace anomalous vectors. Only those vectors deemed "bad" ($BAD_{XY}$) are replaced with "filtered" vectors ($V_{XY}^{FILTERED}$), the remaining vectors being left unchanged.

Figure 7:
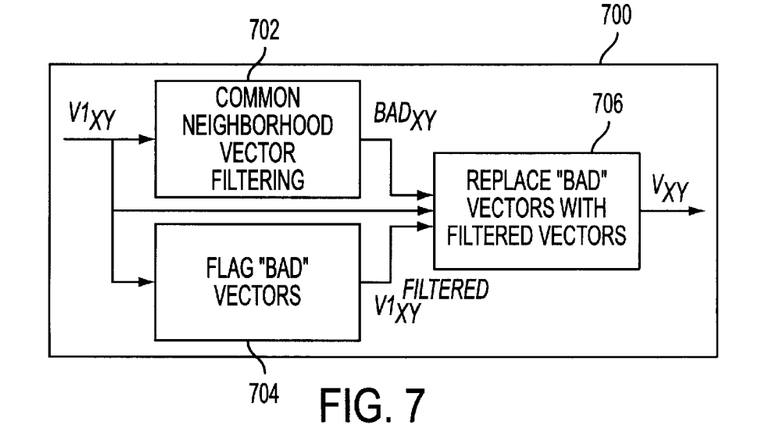
FIG. 7 is a block diagram of a vector filtering process.

Referring To FIG. 7, a filter 700 is illustrated which receives a motion vector $V1_{XY}$ as an input. The motion vector is supplied to each of a common neighborhood vector filter 702, a unit 704 for flagging "bad" vectors, and a unit 706 for replacing "bad" vectors with filtered vectors. Of course, the components of the filter 700 can be implemented as software executed by any desired processor, including but not limited to, the processor used to perform the correlation functions.

Although any known filtering technique can be used, in one exemplary embodiment, a filtering technique is implemented as follows. A vector can be flagged as bad in unit 704 if there are not at least two adjacent pixels in the frame $P_t$ (the components labeled "A" in FIG. 8B) with the same motion vector components ($x1_{XY}, y1_{xy}$) as the center position labeled "X" in FIG. 8A. If the vector is flagged as bad, it is replaced with a filtered vector.

A filtered vector can be produced in any known fashion. However, in accordance with a feature of the present invention, a polling technique is implemented to select the best motion vector to replace a vector flagged as bad for a pixel of interest. That is, the vector filter 702 tests the pixel of interest, represented as the center position labeled "a" in FIGS. 8B, and each of a set of predetermined neighbors, such as the adjacent neighbors labeled "c", "e", "g", "i" in FIG. 8B, to determine the most consistent vector (that is, which motion vector is predominant among these five locations).

To determine the most predominant vector, a weighting process can be used to determine a weighted measure for each of the five positions (in any desired order) "a", "c", "e", "g", and "i". For each of these five positions, the motion vector associated with the given position can be compared to that of the eight remaining pixels in the neighborhood to produce a weighted measure. The testing of the center position can be performed last so as to not modify the motion vector if the center position's weighted measure equals any its adjacent neighbor's weighted measure, thereby avoiding any filtering of the center position. In one implementation, the adjacent positions can be assigned a weighted value of two, and the diagonal positions labeled "b", "d". "f" and "h" in FIG. 8B can be assigned a weighted value of one, as shown in FIG. 8C. The center position can also be assigned a weight of two.

Figure 8A:
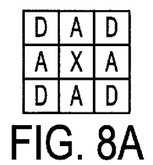
FIGS. 8A–8C are 8-connected neighborhood identifications and filter weighting.
Figure 8B:
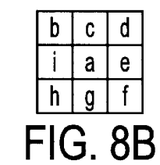
Figure 8C:
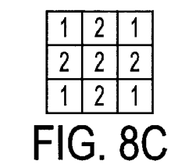

To calculate a weighted measure for the first adjacent position "e" of FIG. 8A, the x,y motion vector components at position "e" are compared with the motion vector components in each remaining pixel position of the neighborhood. For each comparison, if a match exists, a counter is incremented with the weighted value of the position to which the position "e" is being compared. That is, if the motion vector at position "e" matches the motion vector at position "a", the counter is incremented by 2. If the motion vector of position "e" also matches the vector at position "b", the counter is incremented by 1. When the vector at position "e" has been compared to all positions in the neighborhood, the counter will possess a count value between 0 and 12.

The foregoing process is repeated for each of the other adjacent positions "c", "g" and "i" to determine a count value as a weighted measure for each position. Finally, a weighted measure is determined for the center position "a".

The weighted measures are then compared, and the highest of the five count values determine for the neighborhood is identified. The motion vector at the position which corresponds to this count value is selected as the motion vector for the pixel of interest (i.e., for the center pixel "a"). Should two or more positions have equally high count values, but different motion vector components, the motion vector associated with the last calculated weighted measure having the highest value can be selected. For this reason, the weighted measure associated with the pixel position "a" can be calculated last so that the motion vector of the center position will be left unchanged if this position is one of multiple positions having the high count value. If during the filtering process, all five weighted counts are different, the unit 706 can permit the center pixel motion vector to remain unchanged. The unit 706 then supplies the selected motion vector $V_{XY}$ as an output.

b. Motion Vector Confidence Metric

Exemplary embodiments generate a confidence metric for each pixel location of the reference frame as a measure of the accuracy with which the motion vector for the pixel has been generated. The FIG. 1 confidence metric computation unit 106 receives the best correlation point C1, the second best correlation point C2 spaced by at least a predetermined distance from C1, and the average correlation value $\overline{C}$ for computing the confidence metric of a given pixel.

A motion vector may not represent the true motion, particularly if it occurs in a bland area of the image. It is therefore valuable to have a metric that can be used to quantify the confidence associated with the motion vector.

Two confidence metrics are defined which are indicative of the accuracy of the best motion vector $V_{XY}$. The absolute confidence metric ($M_{XY}^{ABS}$) computes a ratio of the best correlation value with respect to the average correlation value of the surface. This confidence metric quantifies the correlation "strength" and is defined as:

$$M_{XY}^{ABS} = 1 - \frac{C1_{XY}}{\overline{C}_{XY}}$$

The relative confidence metric ($M_{XY}^{REL}$) computes a ratio of the difference between the correlation values of the best and second-best correlation points with respect to ($1-C1_{XY}$). This confidence metric, which is a function of the difference between the correlation values C2 and C1, quantifies the correlation "ambiguity" and is defined as:

$$M_{XY}^{REL} = \frac{C2_{XY} - C1_{XY}}{1 - C1_{XY}}$$

These can be further combined into a single confidence metric by, for example, a simple multiplication:

$$M_{XY} = M_{XY}^{ABS} * M_{XY}^{REL}$$

where $M_{XY}$ can, for example, be within a range of 0 and 1.

Where the motion vector supplied from motion vector filter unit 104 is a filtered vector that has been substituted for the original motion vector, the confidence metric can still be calculated using the correlation data associated with the original motion vector. However, in an alternate embodiment, the confidence metric can be recalculated using the correlation data associated with the substituted motion vector.

Figure 9A:
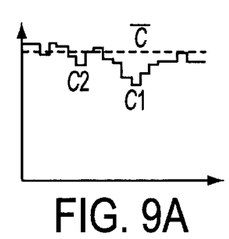
FIGS. 9A–9C are examples of weak, ambiguous, and strong correlations.
Figures 9B, 9C:
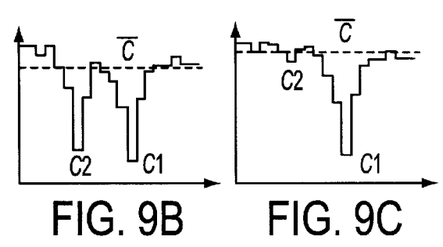

Three examples of absolute/relative confidence metric combinations are shown in FIGS. 9A–9C. The first example of FIG. 9A would result in both a poor absolute and a poor relative confidence metric. The best correlation is close to both the average correlation and the second best correlation point. This type of correlation distribution occurs with a bland image area.

The second example of FIG. 9B would result in a good absolute correlation metric, but a poor relative metric. The best correlation C1 has an SAD which is much lower than the average, but not significantly lower than the second-best correlation point. This type of correlation distribution is often seen where repeating patterns occur in an image.

The third example of FIG. 9C would result in a good absolute metric as well as a good relative confidence metric. As in FIG. 9B the best correlation point is much lower than the average correlation, but here the second-best correlation point is considerably higher indicating a strong correlation with low ambiguity.

2. Detecting Image Motion Among Interlaced Images

Figure 10:
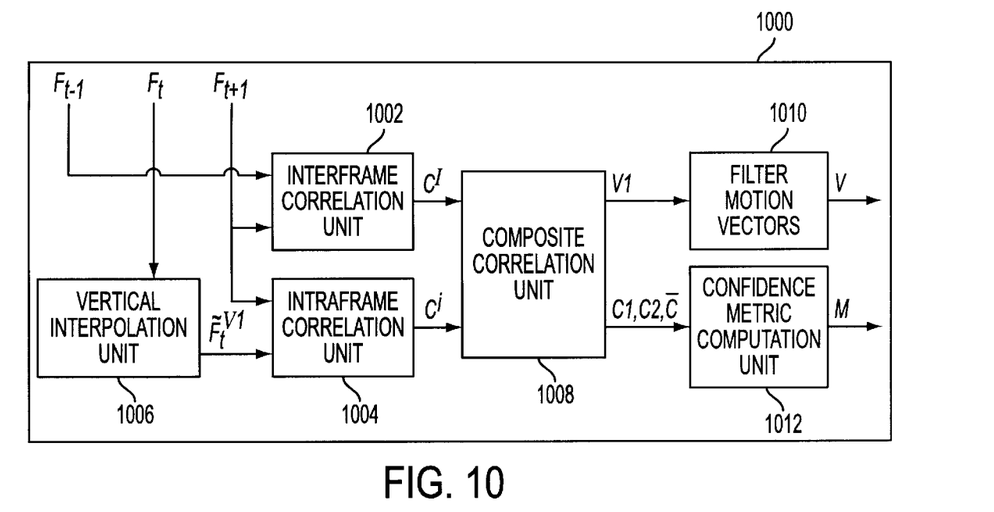
FIG. 10 is a block diagram of an exemplary motion estimator for interlaced images in accordance with the present invention.

FIG. 10 illustrates an exemplary embodiment of the present invention for processing interlaced video images, such as sequential interlaced fields of a television video signal, to detect image motion. In the FIG. 10 motion estimator system 1000, three source fields labeled $F_{t-1}$, $F_t$ and $F_{t+1}$, represent three consecutive source fields (e.g., two fields of even numbered scan lines of a video frame and one field of odd numbered scan lines of a video frame, or vice verse).

To detect image motion among interlaced video images, wherein consecutive fields provide spatially interlaced pixels, two methods are used to produce correlation surfaces for each pixel of a reference field. The resultant sets of correlation surfaces are then combined to extract a motion vector and confidence metric for each pixel of the reference field. The first method includes an intraframe correlation implemented using means for comparing first information obtained from pixel locations of a first field with second information obtained from pixel locations of a second field, said second field being temporally separated and spatially nonaligned with respect to said first field, to generate a first correlation surface, this means being represented as an intraframe correlation unit 1004. The second method includes an interframe correlation implemented using means for comparing the first information with third information obtained from pixel locations of a third field, the third field being temporally separated and spatially aligned with the first field, to generate a second correlation surface, represented as an interframe correlation unit 1002.

The interframe correlation involves two spatially aligned fields which are temporally one frame apart, and therefore spatially aligned (e.g., two successive even fields, or two successive odd fields). The two aligned fields can be considered to be temporally spaced by a time 2Δt. Outputs of the interframe correlation will be denoted by an upper-case "I".

The intraframe correlation involves two fields which are temporally one field apart, and therefore spatially non-aligned (e.g., two successive, spatially nonaligned fields, such as an even field, and a successive odd field). The two fields used for the intraframe correlation can be considered to be temporally spaced by a time Δt. Outputs of the intraframe correlation will be denoted by a lower-case "i".

Because the intraframe correlation is performed using two spatially nonaligned fields (e.g., one which includes the even numbered scan lines of the video frame, and another which includes the odd numbered scan lines of the video frame), a vertical interpolation is performed on field $F_t$ using a vertical interpolation unit 1006. The vertical interpolation unit spatially aligns the scan lines of the two fields, thereby permitting a correlation between the two fields in the intraframe correlation unit 1004.

The vertical interpolation of, for example, the reference field $F_t$ can be performed by simply averaging the pixel values immediately above and below a pixel location of interest. For example, where the field $F_t$ includes even numbered scan lines of pixel information, the pixel locations of the odd numbered scan lines can be interpolated using the pixel information in the even lines. That is, the first pixel location in scan line 3 can be interpolated by averaging the pixel information contained within the first pixel location of scan lines 2 and 4. Where only one adjacent scan line exists, as would be the case with the first can line, the pixel information in scan line 2 can simply be duplicated. Of course, any desired interpolation technique, vertical or otherwise, can be used to fill in pixels of the scan lines needed to establish spatial alignment with the other field or fields to be used in the correlation process. The interpolated field in designated $\tilde{F}_t^{V1}$ in FIG. 10.

After calculating the interpolated field, the intraframe correlation can be performed. The interframe correlating, which already involves spatially aligned fields, can also be performed. For each pixel of the reference frame $F_t$, the interframe correlation unit 1002 and the intraframe correlation unit 1004 produce a correlation surface $C^I$ and $C^i$, respectively. The correlation surfaces of the interframe correlation and the intraframe correlation are supplied to a means for combining, represented as a composite correlation unit 1008, which in turn combines the two correlation surfaces produced for each pixel of the reference field to produce a composite correlation surface. Using the composite correlation surface for a given pixel, an unfiltered motion vector V1 and associated confidence metric are extracted from correlation data C1, C2, $\overline{C}$ for that pixel of the reference field $F_t$. This process is repeated until an unfiltered motion vector and associated confidence metric have been produced for all pixels. The unfiltered motion vectors for all pixels of the reference frame are supplied to a filter 1010 to produce filtered motion vectors in a manner already described with respect to progressive images.

Correlation data extracted from the correlation surfaces in the composite correlation unit 1008 are supplied to a confidence metric computation unit 1012, to produce a confidence metric M for each pixel in a manner already described with respect to progressive images. The motion vector filter 1010 and the confidence metric computation unit 1012 can be configured similar to those described with respect to the filter 104 and the computation unit 106 of FIG. 1.

Thus, the FIG. 10 system 1000 output includes a filtered motion vector $V_{XY}$ and motion vector confidence metric $M_{XY}$ for every pixel X,Y in the reference field $F_t$. The motion vectors define the shift required to temporally align $F_{t-1}$ (one field before) and $F_{t+1}$ (one field after) with $F_t$ (the field of interest). The confidence metric defines the certainty (quantified as a value from 0 to 1) that the vectors are accurate. In accordance with exemplary embodiments of the present invention, the components of the FIG. 10 motion estimator can be implemented using dedicated hardware, such as a pipelined processor, or can be implemented as software executed by any of the processors disclosed in the aforementioned U.S. applications. The intraframe and interframe correlations will be described in greater detail.

a. Intraframe Correlation

Figure 11:
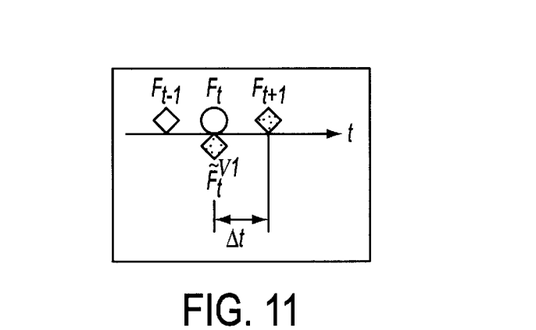
FIG. 11 is a symbolic representation of fields used in intraframe correlation.

The intraframe correlation utilizes fields $F_{t-1}$ and $\tilde{F}_t^{V1}$ temporally spaced by one field $\Delta t$, as shown symbolically in FIG. 11, to produce a first correlation surface for each pixel of reference frame $F_t$. The "~" denotes that the interpolation field is the spatial complement to $F_t$, and the "VI" denotes that it is derived using vertical interpolation. The diamond and square are used to differentiate between odd and even fields.

Figure 12A:
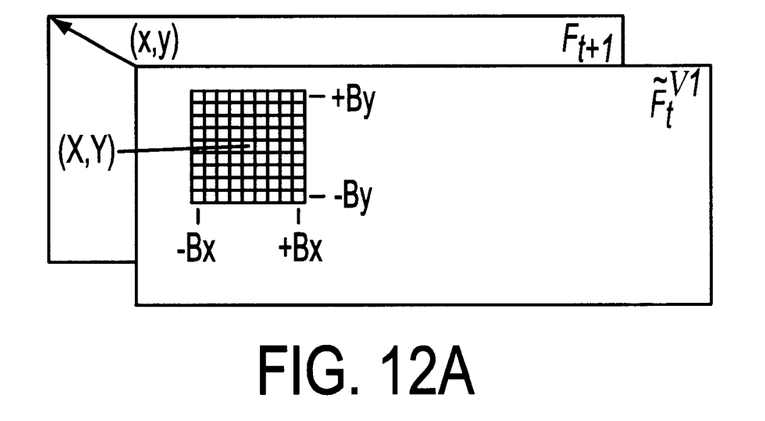
FIGS. 12A and 12B are illustrations of intraframe correlation.
Figure 12B:
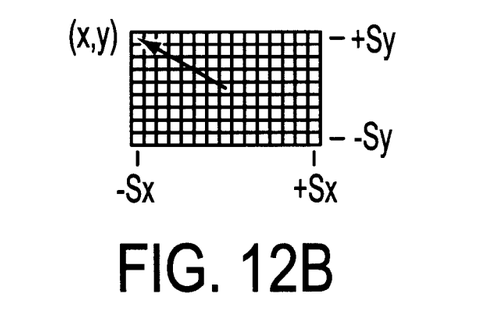

The intraframe correlation process is illustrated in FIGS. 12A and 12B. In an exemplary embodiment, this correlation process is implemented using pixel correspondence based on a search area ±Sx, ±Sy and a block ±Bx, ±By movable within the search area as was described with respect to the pixel correspondence approach to correlating progressive frames. The intraframe correlation results in a correlation point for each location of the block center within the search area. Each correlation point is determined as follows:

$$C^i_{XY}(x,y) = \frac{\sum_{i=-B_x}^{B_x}\sum_{j=-B_y}^{B_y} |\tilde{F}_t^{VI}(X+i, Y+j) - F_{t+1}(X+i+x, Y+j+y)|}{\Delta t}$$

The mapping of all correlation points for each location of the block center in the search area constitutes a correlation surface $C^i$ for a given pixel in the reference field $F_t$. Each correlation point on the correlation surface $C^i$ represents a pixel location in the search area of the field $F_{t-1}$. This process is repeated for all pixels in the field of interest.

b. Interframe Correlation

Figure 13:
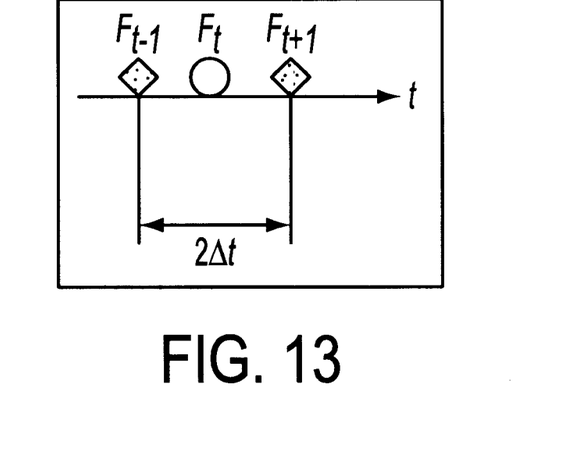
FIG. 13 is a symbolic representation of fields used in interframe correlation.
Figure 14A:
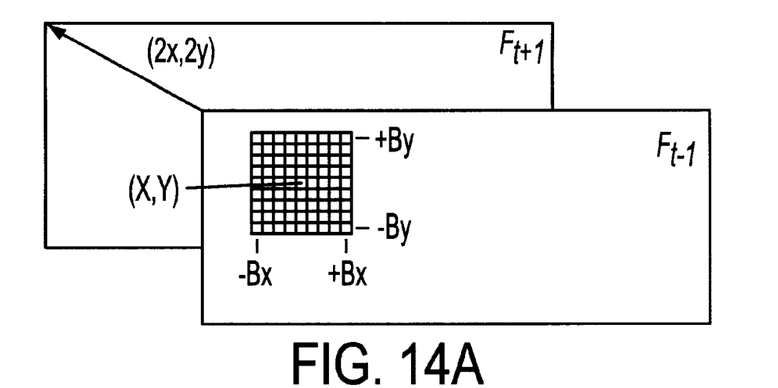
FIGS. 14A and 14B are illustrations of interframe correlation.
Figure 14B:
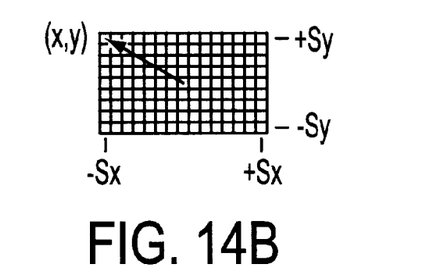

The interframe correlation utilizes spatially aligned fields $F_{t-1}$ and $F_{+1}$ that are temporally separated by two fields (i.e., one frame with a temporal separation of 2 $\Delta t$), as shown symbolically in FIG. 13. The interframe correlation process is illustrated in FIGS. 14A and 14B. As with the intraframe correlation, this correlation process is implemented using pixel correspondence based on a search area ±Sx, ±Sy and a block ±Bx, ±By movable within the search area, as was described with respect to the pixel correspondence approach to correlating progressive frames. The intraframe correlation results in a correlation point for each location of the block center within the search area. Each correlation point is determined as follows:

$$C^I_{XY}(x,y) = \frac{\sum_{i=-B_x}^{B_x}\sum_{j=-B_y}^{B_y} |F_{t-1}(X+i, Y+j) - F_{t+1}(X+i+2x, Y+j+2y)|}{2\Delta t}$$

The mapping of all correlation points for each location of the block in the search area constitutes a correlation surface $C^I$ for a given pixel in the reference field $F_t$. Each correlation point on the correlation surface $C^I$ represents a pixel location in the search area of the field $F_{t-1}$. Thus, this process is identical to intraframe correlation with the exception that $F_{t-1}$ is shifted by twice the vector magnitude (i.e. 2x and 2y) due to the two field temporal separation.

The correlation surface of the intraframe correlation implies the motion vector over a one $\Delta t$ time increment. A two-pixel shift between fields with a 2 $\Delta t$ separation has the same rate (assuming constant velocity) as a one-pixel shift between fields with a $\Delta t$ separation. Thus, the image motion implied by the correlation surface $C^I$ has been normalized to the same rate (pixels per $\Delta t$) as the correlation surface $C^i$ such that these surfaces can be composited. The composite surface can be used to extract the correlation data C1, C2, $\overline{C}$, and derive motion vector information for each pixel of the interlaced reference field $F_t$.

c. Correlation Compositing

The outputs of the interframe and intraframe correlation are their respective correlation surfaces. The two surfaces $C_{XY}^i$ and $C_{XY}^I$ for every pixel in the reference image can be composited as follows:

$$C_{XY}(x,y) = f(C_{XY}^i, C_{XY}^I)$$

where $f$ is a function such as simple summation, weighted summation, or multiplication, or combination thereof.

Combining the intraframe and interframe correlation takes advantage of each of their strengths. Intraframe correlation uses two inputs that are temporally one field apart, thus minimizing the effect of acceleration of objects within the image. Interframe correlation uses two unmodified (non-interpolated) inputs, which provides a more accurate correlation.

Figure 15A:
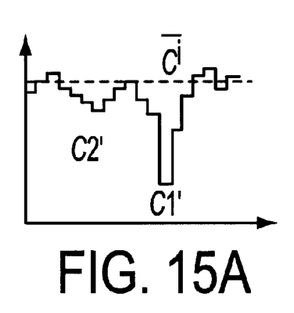
FIGS. 15A–15C are correlation surface vertical cross-sections illustrating correlation compositing.
Figure 15B:
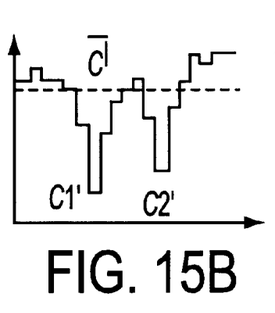
Figure 15C:
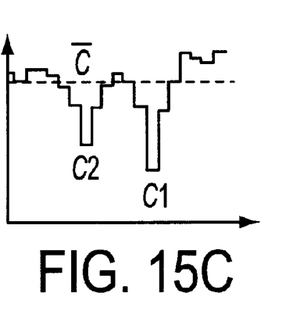

The benefit of surface compositing is illustrated in FIGS. 15A–15C. The plots show a vertical cross-section through intraframe, interframe, and composite correlation surfaces. In FIG. 15A, representing a cross-section of a correlation surface $C^i$ for a given pixel of reference field $F_t$, as determined using intrafield correlation, the best correlation point C1 is significantly lower in value than the second-best correlation point C2. In FIG. 15B, representing a cross-section of a correlating surface $C^I$ for the same pixel of reference field $F_t$, as determined using interfield correlation, the best correlation point C1 is only slightly better that C2, though in a different location from the best correlation point C1 in FIG. 15A. By the simple addition (or averaging) of these two surfaces $C^i$ and $C^I$ in FIG. 15C, the correlations that are not in common are attenuated while the correlations that coincide are reinforced.

The results of the correlation compositing for each pixel of the reference field $F_t$ can be used to extract correlation data that, in turn, is used to derive a motion vector and confidence metric for each pixel of the reference field in a manner as described with respect to processing of progressive images. In addition, filtering of the motion vectors can be performed in a manner as described with respect to that of the FIG. 1 motion estimator.

After motion vectors have been determined for the pixels of a reference field or frame, they can be used to produce any number of synthesized fields or frames at any desired frame rate in a manner as described, for example, in commonly assigned U.S. application Ser. No. 09/535,534, entitled TEMPORAL INTERPOLATION OF INTERLACED OR PROGRESSIVE VIDEO IMAGES, filed on even date herewith, the contents of which are hereby incorporated by reference in their entirety. That is, by multiplying the motion vectors by any integer or fraction, to achieve a desired temporal and spatial shift of the image information included in the pixel locations of the reference field or frame, any number of additional fields or frames can be synthesized.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for detecting image motion among at least two video images, each image being represented using a plurality of pixels, the method comprising the steps of:

comparing first information obtained from pixels used to represent a first image with second information obtained from pixels used to represent a second image, to produce a correlation surface representative of image motion;

extracting a motion vector from correlation data included in said correlation surface as a measure of image motion among the at least two images; and producing a measure of confidence of accuracy with which said motion vector is generated, said measure being determined using a first point on said correlation surface and a second point on said correlation surface, said second point being spaced at least a predetermined distance from said first point on said correlation surface, wherein the step of producing a measure of confidence includes a step of:

producing an average correlation value for each pixel, and wherein the step of producing a measure of confidence includes steps of:

producing an absolute confidence metric as a ratio of a correlation value of the first point on the correlation surface to the average correlation value;

producing a relative confidence metric as a function of a difference between a correlation value of the second point and the correlation value of the first point; and combining the absolute confidence metric and the relative confidence metric.

2. Method for detecting image motion among at least two video images, each image being represented using a plurality of pixels, the method comprising the steps of:

comparing first information obtained from pixels used to represent a first image with second information obtained from pixels used to represent a second image, to produce a correlation surface representative of image motion;

extracting a motion vector from correlation data included in said correlation surface as a measure of image motion among the at least two images;

producing a measure of confidence of accuracy with which said motion vector is generated, said measure being determined using a first point on said correlation surface and a second point on said correlation surface, said second point being spaced at least a predetermined distance from said first point on said correlation surface; and identifying whether the motion vector requires filtering by comparing said motion vector to a motion vector of at least one adjacent pixel, wherein the filtering includes steps of:

assigning weighted values to pixels in a neighborhood about a pixel of interest;

comparing a motion vector of one pixel in the neighborhood to motion vectors in remaining pixels of the neighborhood to calculate a weighted measure of the one pixel;

repeating the step of comparing for other predetermined pixels of the neighborhood to calculate plural weighted measures for the neighborhood;

comparing the plural weighted measures; and selecting a motion vector from the pixel having a highest weighted measure as the motion vector for a pixel of interest in the neighborhood.

3. Method for processing at least two images to detect image motion among the at least two images, each image being represented using a plurality of pixels, the method comprising the steps of:

comparing first information obtained from pixels of a first field with second information obtained from pixels of a second field, the second field being temporally separated and spatially nonaligned with respect to the first field, to generate a first correlation surface;

comparing the first information with third information obtained from pixels of a third field, the third field being temporally separated and spatially aligned with the first field, to generate a second correlation surface;

combining said first and second correlation surfaces to produce a composite correlation surface;

extracting a motion vector from correlation data included in said composite correlation surface as a measure of image motion among the at least two video images; and producing a measure of confidence of accuracy with which said motion vector is generated, wherein the step of producing the measure of confidence includes a step of:

producing an average correlation value for each pixel, and wherein the step of producing the measure of confidence includes steps of:

producing an absolute confidence metric as a ratio of a correlation value of the first point on the correlation surface to the average correlation value;

producing a relative confidence metric as a function of a difference between a correlation value of the second point and the correlation value of the first point; and combining the absolute confidence metric and the relative confidence metric.

4. Method for processing at least two images to detect image motion among the at least two images, each image being represented using a plurality of pixels, the method comprising the steps of:

comparing first information obtained from pixels of a first field with second information obtained from pixels of a second field, the second field being temporally separated and spatially nonaligned with respect to the first field, to generate a first correlation surface;

comparing the first information with third information obtained from pixels of a third field, the third field being temporally separated and spatially aligned with the first field, to generate a second correlation surface;

combining said first and second correlation surfaces to produce a composite correlation surface;

extracting a motion vector from correlation data included in said composite correlation surface as a measure of image motion among the at least two video images; and identifying whether the motion vector requires filtering by comparing said motion vector to a motion vector of at least one adjacent pixel, wherein the filtering includes steps of:

assigning weighted values to pixels in a neighborhood about a pixel of interest;

comparing a motion vector of one pixel in the neighborhood to motion vectors in remaining pixels of the neighborhood to calculate a weighted measure for the one pixel;

repeating the step of comparing for other predetermined pixels of the neighborhood to calculate plural weighted measures for the neighborhood;

comparing the plural weighted measures; and selecting a motion vector from the pixel having a highest weighted measure as the motion vector for pixel of interest.

* * * * *